United States Patent
Stark

[19]

[11] Patent Number: 5,816,315
[45] Date of Patent: Oct. 6, 1998

[54] PLATE-TYPE CROSSFLOW AIR-TO-AIR HEAT EXCHANGER HAVING DUAL PASS COOLING

[75] Inventor: Walter Stark, Halesite, N.Y.

[73] Assignee: Nautica Dehumidifiers, Inc., Huntington, N.Y.

[21] Appl. No.: 527,653

[22] Filed: Sep. 13, 1995

[51] Int. Cl.$^6$ .................................................. F25B 29/00
[52] U.S. Cl. .................................. 165/66; 62/90; 62/93; 62/95; 165/166; 165/54
[58] Field of Search .............................. 165/66, 54, 166; 62/90, 93, 95

[56] References Cited

U.S. PATENT DOCUMENTS

| | | |
|---|---|---|
| 2,093,725 | 9/1937 | Hull . |
| 2,093,968 | 9/1937 | Kettering . |
| 2,128,641 | 8/1938 | Folsom . |
| 2,691,488 | 10/1954 | Ghai ............................................ 165/66 |
| 2,828,947 | 4/1958 | Hedbom . |
| 2,875,986 | 3/1959 | Holm ........................................... 165/66 |
| 3,265,129 | 8/1966 | Bawabe . |
| 3,513,907 | 5/1970 | Hughes . |
| 3,666,007 | 5/1972 | Yoshino et al. . |
| 3,797,565 | 3/1974 | Fernandes .................................... 62/93 |
| 3,860,065 | 1/1975 | Schauls . |
| 3,866,674 | 2/1975 | Tramuta et al. . |
| 4,041,591 | 8/1977 | Noll et al. . |
| 4,051,898 | 10/1977 | Yoshino et al. . |
| 4,099,928 | 7/1978 | Norback . |
| 4,334,577 | 6/1982 | George . |
| 4,377,201 | 3/1983 | Kruse et al. . |
| 4,377,400 | 3/1983 | Okamoto et al. . |
| 4,429,735 | 2/1984 | Nomaguchi et al. . |
| 4,512,397 | 4/1985 | Stark . |
| 4,517,810 | 5/1985 | Foley et al. . |
| 4,761,966 | 8/1988 | Stark . |
| 4,862,953 | 9/1989 | Granetzke et al. . |
| 4,971,137 | 11/1990 | Thompson . |
| 4,998,580 | 3/1991 | Guntly et al. . |
| 5,036,907 | 8/1991 | Leven . |
| 5,279,360 | 1/1994 | Hughes et al. . |
| 5,309,725 | 5/1994 | Cayce ........................................... 62/90 |

FOREIGN PATENT DOCUMENTS

| | | |
|---|---|---|
| 470100 | 12/1950 | Canada . |
| 818603 | 8/1959 | Canada . |
| 0086175 | 2/1983 | European Pat. Off. . |
| 2514713 | 10/1975 | Germany . |
| 2616556 | 5/1977 | Germany ..................................... 62/93 |
| 2644567 | 4/1978 | Germany . |
| 47-019990 | 2/1971 | Japan . |
| 0049666 | 4/1979 | Japan ........................................ 165/54 |
| 54-44255 | 4/1979 | Japan . |
| 55-121394 | 9/1980 | Japan . |
| 55-160297 | 12/1980 | Japan . |
| 0311086 | 12/1988 | Japan ........................................ 62/93 |
| 63311086 | 12/1988 | Japan . |
| 0184358 | 7/1989 | Japan ........................................ 165/54 |
| 851082 | 7/1981 | U.S.S.R. . |

Primary Examiner—John K. Ford
Attorney, Agent, or Firm—Dilworth & Barrese

[57] ABSTRACT

A heat exchanger for dehumidifying a stream of air including heat conducting channel walls which serve as the heat exchange surface for precooling and reheating air during the dehumidification process. Cooling conduits are positioned in a plane parallel to a plane defined by the heat conducting walls, such that cooling occurs both in the intake and exhaust airstreams, and the airflow is redirected in a small plenum chamber located at an end of the channels adjacent the cooling conduits. A system is also provided which includes a plurality of heat exchangers in series sharing a common cooling coil and a common plenum chamber.

4 Claims, 6 Drawing Sheets

PLATE-TYPE CROSSFLOW AIR-TO-AIR HEAT EXCHANGER HAVING DUAL PASS COOLING

BACKGROUND OF THE INVENTION

1. Field of the Invention

The present invention relates to an improvement in the dehumidification of air through the provision of a plate-type crossflow air-to-air heat exchanger having a series of parallel plates enclosed in a housing which forces flowing air to be redirected for exhaust in a plenum chamber where it is cooled in a two pass flow path over a cooling coil which consists of a plurality of cooling conduits or tubes which are separated by and held as a single unit by a multitude of fins through which the conduits pass. The heat exchanger also allows a regenerative heat exchange between the intake and exhaust airstreams of the air-to-air heat exchanger.

The invention further provides for the cooling coil to be arranged in a manner in which the individual cooling conduits extend in a plane which is parallel to a plane defined by the series of plates, while the fins and the cooling coil unit extends in a plane perpendicular to the plane defined by the series of plates. The cooling coil is positioned in the plenum chamber so that the air flowing through the heat exchanger passes over the cooling conduits twice before it exits the housing. The invention further includes the provision of arranging a number of the heat exchanger units in series utilizing a common cooling coil and a common plenum chamber to reduce the size of the system and the energy requirements for operating the system to condition a large volume of air.

2. Discussion of the Prior Art

Conditioning of airstreams in residences and office buildings typically requires relatively large amounts of energy to provide comfortable ambient indoor air under a variety of weather conditions, depending upon the climate and the season. Devices that cool and/or dehumidify air are well known, whereby as the air is cooled, moisture condenses out of the air resulting in cooler, drier air being returned to the ambient atmosphere. In the design of a dehumidifying heat exchanger, an important question is whether, and how much, heating will be applied to the air after it has been cooled for the purpose of dehumidifying it. If the cooled, and thus dehumidified air is simply exhausted into the ambient indoor space without further heating, the process is one of traditional air conditioning. However, if after dehumidification, the air is reheated before being exhausted into the ambient space, the process will be one of traditional dehumidification. Dehumidification is controlled by ambient humidity alone, and the unit is engaged and shut down on this criteria alone.

In the prior art, there exists a number of heat exchangers utilizing a regenerative type of heat exchange airflow in which air is forced through the housing in intake channels and then redirected into exhaust channels. Cooling fluid conduits are provided so that the air passes over the conduits which are typically arranged in a plane perpendicular to the channels and which are in thermal contact with the walls defining the channels, such that the conduits typically pass through the walls. An example of such a regenerative heat exchanger is disclosed in U.S. Pat. No. 2,128,641 to Folsom, which discloses a dehumidifier in which the walls between the channels serve as the heat exchange surface for the air as it passes through the intake channels, over the cooling conduits, and then around the channel walls in a plenum chamber into the exhaust channels and back over the cooling conduits. The air is then exhausted back into the atmosphere through exhaust ports located adjacent to the intake ports at the first end of the unit.

U.S. Pat. No. 4,761,966 to Stark teaches cooling and reheating for dehumidification in a crossflow arrangement, as well as an air temperature and water temperature control system for high humidity locations such as indoor pools. U.S. Pat. No. 4,517,810 to Foley et al. teaches regenerative heat exchange using a "run around loop", and Canadian Patent No. 470,100 teaches the use of a corrugated plate in a heat exchange element. U.S. Pat. No. 2,093,725 to Hull teaches the provision of cooling conduits sandwiched between the heat conducting walls of the heat exchanger.

In the prior art heat exchangers, there is generally required large plenum space to convey the intake air to a cooling conduit or to convey exhaust air leaving the cooling conduit to the final pass through the regenerative heat exchanger. The large plenum space in the prior art thus could be disposed either upstream of the cooling conduit or downstream of the cooling conduit. Accordingly, prior art heat exchangers required a large area for installation, and also required an excessive amount of energy to force the air through the heat exchanger. Efforts to reduce the plenum space, such as that shown in Folsom, require that the cooling conduits be constructed to pass through the plates of the heat exchanger.

Volumetric efficiency quantifies the required equipment volume in per unit of capacity at a given performance level. In plate-type crossflow air-to-air heat exchangers, to increase the volumetric efficiency and economy of the unit the smallest possible plate size should be used. However, crossflow heat exchangers with smaller plates generally require more length, i.e. more plates, to handle air volumes equal to that of units with larger plates. Increasing the plate size will require a larger installation space which may limit the performance of the heat exchanger. In addition, when using crossflow plate-type air-to-air heat exchangers with smaller plates, the length, or number of plates, typically exceeds the plate dimension. The cooling coil, as stated above, consists of a plurality of tubes which are separated by a series of fins serving as a heat transfer surface for the tubes. Generally, cooling coils have many circuits, each circuit comprising a multitude of cooling tubes connected in series, from entrance to exit, using U-bends. Therefore, for economic and efficient cooling coil selection, the cooling tubes in the prior art tend to run substantially perpendicular to the heat exchanger plates. However, this arrangement requires that each cooling tube or tube circuit be separately balanced due to the temperature gradient across the coil surface, because the temperature leaving a crossflow heat exchanger varies in a direction parallel to the plates. As the coolant fluid passes through the tubes, it absorbs heat sufficient to cool the air which passes over the tubes, typically in the range of 35° F. to 50° F. As the heat is absorbed over the length of the tube or circuit, it is most efficient to have substantially equal temperature conditions, or refrigerant superheating, leaving each tube or circuit. In prior art heat exchangers, as seen in FIG. 1, when the tubes are arranged perpendicular to the plates, the individual tubes or circuits see different temperatures in the airstream, requiring manual, and tedious, balancing of the individual tubes or circuits to ensure equal coolant heat absorption and temperature drops, and thus optimum cooling of the airstream. If the cooling coil of FIG. 1 were placed at the entrance to the exhaust side of the crossflow heat exchanger, performance would improve somewhat because there is more room for mixing of temperature to occur in the plenum chamber. However, the degree of mixing is unpredictable and would be irregular in a confined space such as the plenum chamber.

The novel heat exchanger for dehumidification of the present invention obviates the disadvantages associated with the prior art, by providing a plate-type crossflow air-to-air heat exchanger having a plurality of plates and a cooling coil consisting of tubes and fins, in which the cooling tubes are arranged in a plane parallel to a plane defined by the plates of the heat exchanger, while the coil itself, as well as the fins, extends in a plane generally perpendicular to the plane defined by the plates. The cooling coil is located adjacent to but spaced from the heat exchanger walls while maintaining a seal between the intake channels and exhaust channels as will be described below, and is located in a plenum chamber which redirects the air back over the cooling coil so that a two pass arrangement is achieved as the air passes from the intake channels to the exhaust channels for return to the ambient atmosphere. The heat exchanger of the present invention also facilitates installation in a system which utilizes a number of small units which are operated utilizing a common cooling coil, and may also utilize a common plenum space to reduce the size required for installation, and ultimately provide an efficiently operating and economical system for dehumidifying air in buildings such as homes and offices.

SUMMARY OF THE INVENTION

In heat exchange systems, two airstreams are allowed to pass in channels in close proximity to each other, where the channels are separated by a heat conducting channel wall which, on one side, comprises the heat conducting channel wall for the intake airstream and on the other side comprises the heat conducting channel wall for the exhaust airstream. By so arranging the flow of air, temperature difference between the intake air and the exhaust air provides for thermal transfer through the wall with heat naturally flowing from the higher temperature air to the lower temperature air.

In the present invention, the apparatus is utilized as a dehumidifier, where the intake air is precooled in a regenerative heat exchanger and then further cooled through the provision of a two pass air cooling arrangement. The air cooling process naturally condenses water vapor entrained in the intake air, which along with condensed and condensing water, flows into a condensation collection area which is part of the plenum chamber at the closed end of the apparatus. Condensing water drops into a collection area while the cooled intake air is redirected from the intake direction of the airflow for a second pass through the air cooling arrangement. The exhaust airflow travels through the exhaust channels, of which at least one wall of the channel represents the wall separating the intake channel from the exhaust channel. Through this wall occurs the heat exchange process, where the cooled and dehumidified air is then warmed to return to the ambient atmosphere at a comfortable temperature.

The present invention utilizes sensors to variably and selectively regulate and control the humidity of the air being exhausted from the unit. Other conventional controls may also be provided to operate dampers to control the dehumidification or air cooling processes to provide the option of air conditioning in addition to dehumidification. The apparatus of the present invention includes a plurality of heat conducting walls arranged in side-by-side parallel arrangement, and the entire heat exchange plate arrangement has a generally square or diamond shape. The number of intake and exhaust channels is determined by the amount of plates provided, which is variable with respect to the installation in which the heat exchanger will be utilized. The square shape of the heat exchanger is preferably positioned on a point of the square, such that a diagonal running from one corner of the square to its opposite corner is generally vertical when the unit is installed.

The heat exchanger plates, or heat conducting walls, are preferably provided with means for enhancing the heat conduction process, such as heat conducting spacers, or preferably, a series of corrugations which extend between the walls and are in thermal contact with each of the walls. The corrugations serve the dual purpose of enhancing heat transfer between the walls to facilitate the heat exchange process, and also provide flow paths for the airstream to seal the intake channels from the exhaust channels. The preferred arrangement is a crossflow arrangement, and in this arrangement, the corrugations for the intake channels are substantially arranged at right angles to the corrugations for the exhaust channels, to define the flow path through the heat conducting walls so that the intake airflow is approximately 90° offset from the exhaust airflow.

The present invention includes a housing, having an intake port at the proximal end which is located adjacent to the intake channels and in fluid communication therewith, and also includes an exhaust port in fluid communication with the exhaust channels also at the proximal end. Located at the distal end of the housing is a plenum chamber, and inside the plenum chamber is a cooling coil having cooling conduits or tubes and thin walled fins extending between and supporting the tubes, which pass through the fins. The coil further cools the air and condenses water vapor entrained in the air to dehumidify the air. The cooling coil is located adjacent to but spaced from the heat conducting walls of the heat exchanger, and the conduits or tubes are preferably arranged and extend in a plane which is parallel to a plane defined by the heat conducting walls. The cooling coil itself, and in particular the fins, extends in a plane perpendicular to the plane of the plates or walls, while maintaining the conduits in the same plane as the walls. This permits the air to flow uniformly over the cooling conduits to provide for a more efficient cooling process so that each tube and circuit sees substantially the same temperature profile.

A fan forces the airstream into the heat exchanger of the present invention, as is conventional, through the intake ports so that the airstream enters the heat exchanger at the intake channels. As the airstream passes through the intake channels, it is precooled through the heat exchange process with the heat conducting walls and the corrugations. The precooled air then exits the intake channels and passes over the cooling coil to condense water vapor entrained in the airstream which is then collected in a collection chamber which is part of the plenum chamber. The plenum chamber redirects the air so that it passes over the cooling coil a second time and enters the exhaust channels, where it is warmed through the heat exchange process with the heat conducting walls and the corrugations, prior to exiting the heat exchanger at the exhaust port. The air exiting the heat exchanger of the present invention is thus cooler and drier as it is returned to the ambient atmosphere.

The present invention also contemplates the use of heat conducting spacers instead of the corrugations in the intake channels and the exhaust channels. In this embodiment, the spacers are positioned in the channels to facilitate the assembly process of the heat exchanger and to enhance the heat transfer between the walls. In this embodiment, the exhaust channels must be sealed at the intake port and at the plenum chamber adjacent to the intake channels, and the intake channels must be sealed at the exhaust port and at the plenum chamber adjacent to the exhaust channels. This will ensure the crossflow of the air and the two pass arrangement of the airstream over the cooling conduits of the coil as the air is forced through the heat exchanger for dehumidification.

A further embodiment of the present invention utilizes a plurality of the heat exchanger units in a system which includes a cooling coil which is common to each of the heat exchangers. The cooling conduits or tubes are arranged in a plane parallel to a plane defined by the plates which form the heat conducting walls of each of the individual heat exchangers. It is also contemplated that the plenum chamber may be a common plenum chamber, in a system which is utilized in a large installation.

The present invention provides a thermally regenerative heat exchange system for dehumidification which is embodied in a novel assembly which increases the efficiency and reduces the physical space formerly required for installation of prior art devices. By arranging the cooling coil so that the cooling conduits are parallel to the plane defined by the walls of the heat exchanger, the unit essentially becomes a self balancing system with respect to the coolant fluid passing through the conduits. The present invention is less expensive to manufacture and easier to maintain, and the present invention also accommodates larger installations by providing a means for arranging a number of the heat exchangers in series utilizing a common cooling conduit and a common plenum chamber.

BRIEF DESCRIPTION OF THE DRAWINGS

The foregoing features of the present invention will become more readily apparent and may be understood by referring to the following detailed description of an illustrative embodiment of the heat exchanger for dehumidification, taken in conjunction with the accompanying drawings, in which.

DETAILED DESCRIPTION OF THE PREFERRED EMBODIMENTS

Figure 1:
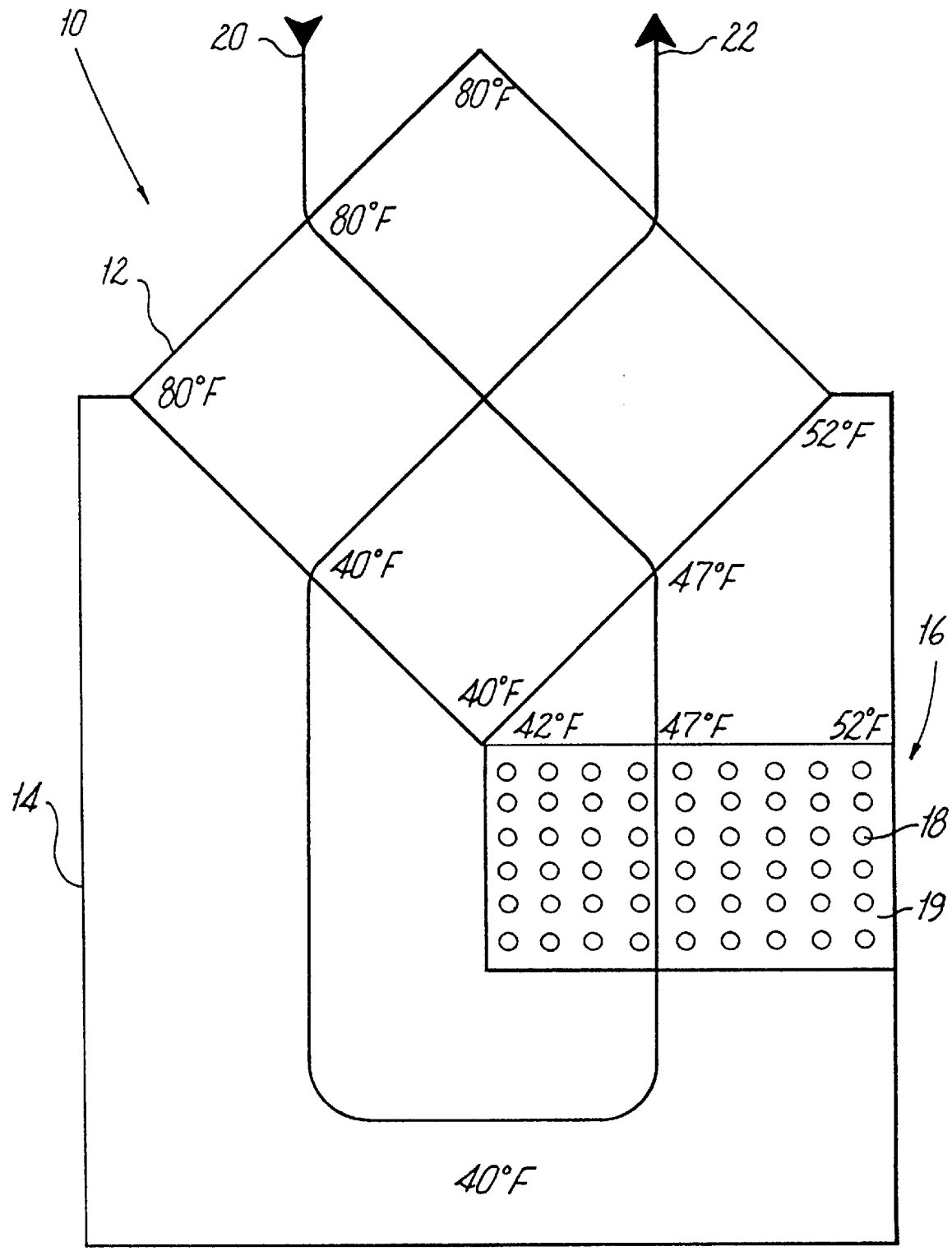
FIG. 1 is a schematic representation of a prior art plate-type crossflow air-to-air heat exchanger showing the flow path of the airstream.

Turning now to the drawings, in which like reference numerals identify similar or identical elements throughout the several views, FIG. 1 illustrates a plate-type crossflow air-to-air heat exchanger which is common in the prior art. Such a heat exchanger 10 includes a plurality of plates comprising heat conducting walls 12 through which the airstream passes. Heat conducting walls 12 are connected to a plenum chamber 14 which redirects the airflow as it enters the plenum chamber through the intake channels to be exhausted through the exhaust channels and back into the atmosphere. As the air passes from the intake channels into the plenum chamber 14, the air passes through a cooling coil 16 which includes a plurality of coolant carrying conduits or tubes 18 and a plurality of thin wall fins 19 extending the length of the coil through which the tubes 18 pass. Tubes 18 are arranged generally perpendicular to a plane defined by the heat conducting walls 12. As seen in FIG. 1, the airstream enters in the direction of arrow 20 and passes through the heat conducting walls 12 and into the plenum chamber 14. The airstream then passes over the cooling coil 16 where water entrained in the airstream is condensed out of the airstream and then the airstream is redirected by the plenum chamber and exits through the exhaust channels of the heat conducting walls 12 in the direction of arrow 22.

Figure 2:
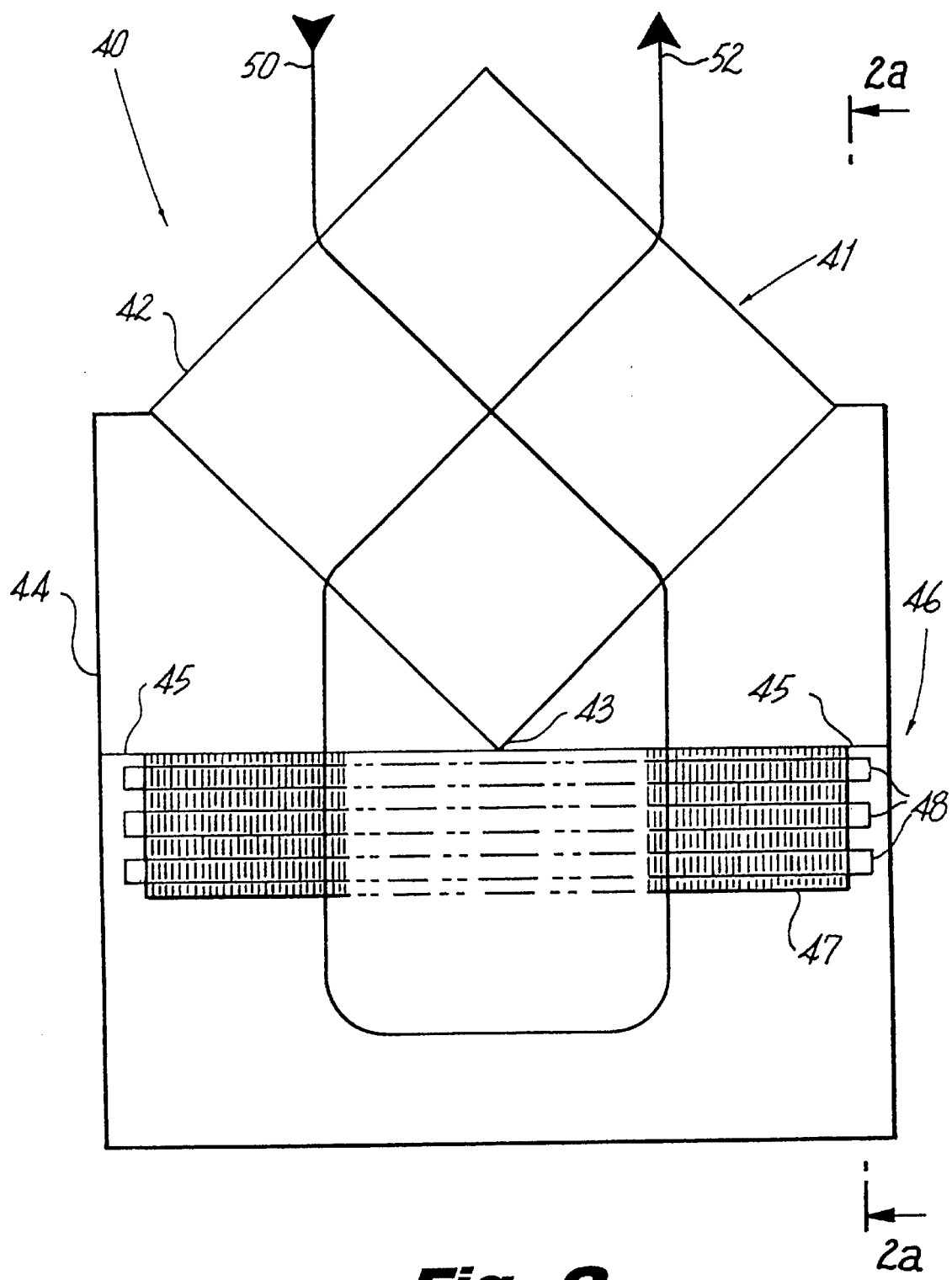
FIG. 2 illustrates a preferred embodiment of the plate-type crossflow air-to-air heat exchanger of the present invention.
Figure 2A:
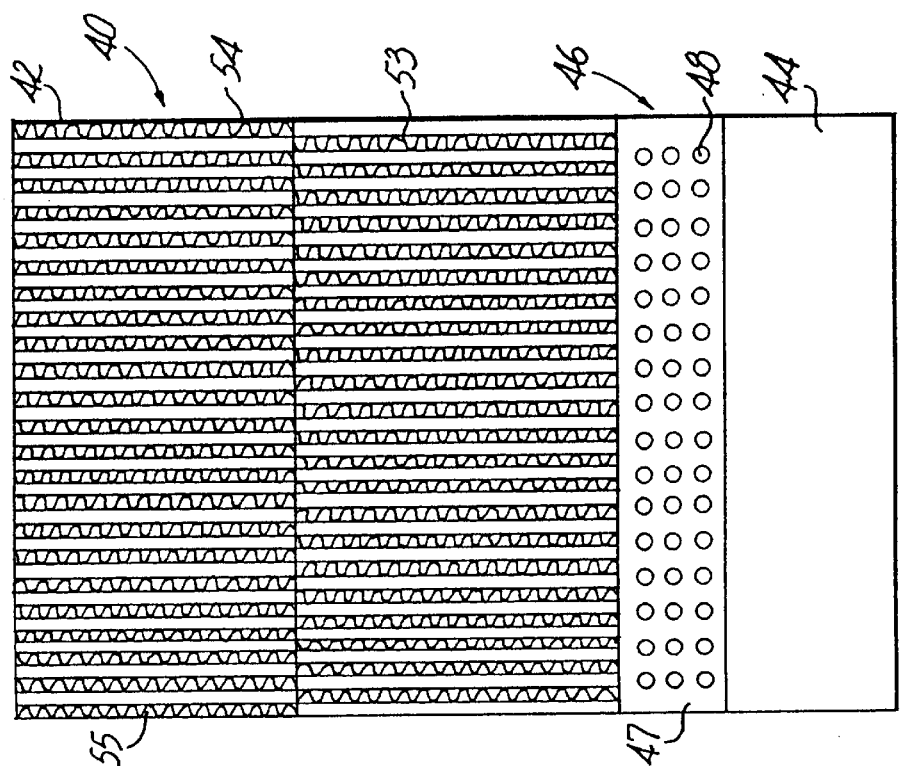
FIG. 2a illustrates a side view of the heat exchanger taken 90° from the view shown in FIG. 2, along lines 2a—2a of FIG. 2.

FIG. 2 illustrates the plate-type crossflow air-to-air heat exchanger according to the present invention. As seen in FIG. 2, heat exchanger 40 includes plate or wall assembly 41 which includes a plurality of heat conducting walls 42 which are attached to plenum chamber 44. In the present invention, the cooling coil 46 is positioned so that coolant carrying tubes 48 are positioned in a plane which is parallel to the plane defined by the heat conducting walls 42. The coil 46 itself, including fins 47, extends in a plane generally perpendicular to a plane defined by the walls 42. As seen in FIG. 2a, heat conducting walls 42 of heat exchanger 40 extend in a plane generally parallel to a plane in which tubes 48 run. Fins 47 run generally perpendicular to the plane walls 42 are located in.

Referring back to FIG. 2, as air enters the intake ports of the heat exchanger housing (not shown) in the direction of arrow 50, it enters the intake channels of the heat conducting walls 42 and passes into the plenum chamber 44 where it passes over the cooling coil 46 for the first time. The coil is secured to the walls 42 at bead 43 which provides a seal to ensure that the airflow passes over the coil 46. Ledge members 45 serve a similar function. The construction of the plenum chamber redirects the airstream so that it passes over the cooling coil 46 a second time prior to exiting the plenum chamber 44 through the exhaust channels and out the exhaust port of the heat exchanger in the direction of arrow 52.

As the intake airstream passes over the coil the first time, while it is desirable for the temperature profile of the airstream to be as uniform as possible, there may be some variations due to temperature differences within the various channels, which then passes over the various conduits, etc. The present invention permits the airstream to mix and reach a substantially uniform temperature in the plenum chamber. The airstream which then passes over the coil the second time is then more efficiently cooled due to the uniformity of the temperature. The air passing to the exhaust channels of the prior art heat exchangers does not have a uniform temperature gradient and therefore is not as efficiently cooled as in the device of the present invention.

Figure 3:
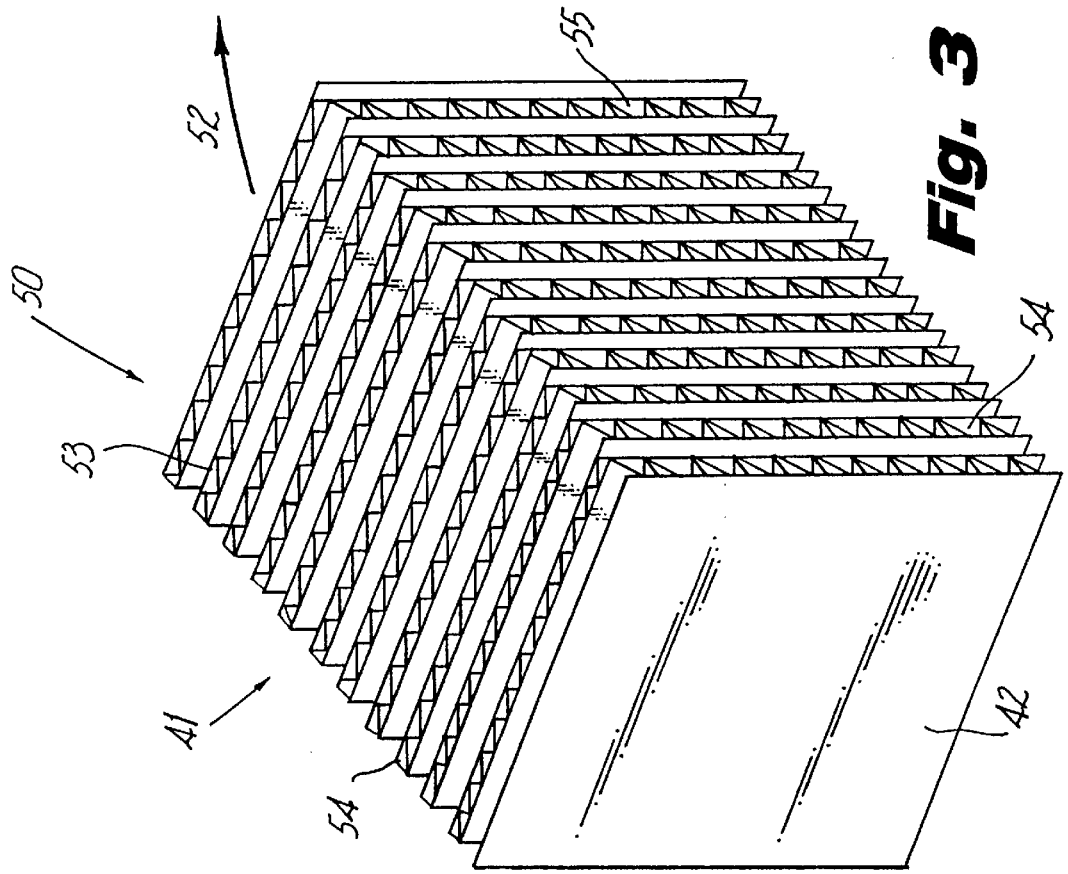
FIG. 3 illustrates a perspective view of the heat conducting walls and the corrugations provided between the walls of the plate-type heat exchanger of FIG. 2.

As seen in FIG. 3, wall assembly 41 includes the heat conducting walls 42 which are positioned side-by-side in parallel arrangement, and preferably include a means for enhancing the heat transfer between the heat conducting walls 42. As shown in FIGS. 2a and 3, preferably the means for enhancing heat conduction comprises a series of corrugations 54 which are maintained in thermal contact with the parallel plates. The intake channels 53 include corrugations which pass in a first direction and the exhaust channels 55 include corrugations which pass in a direction substantially at right angles to the corrugations of intake channels 53. This substantially 90° arrangement between the corrugations assures that the flow of air on the intake side in the direction of arrow 50 flows only through intake channels 53, and that the air leaving the heat exchanger through exhaust channels 55 in the direction of arrow 52 exits only through exhaust channels 55. This ensures that the heat exchanger operates with a crossflow airstream to facilitate the heat exchange process at the heat conducting walls 42.

Figure 4:
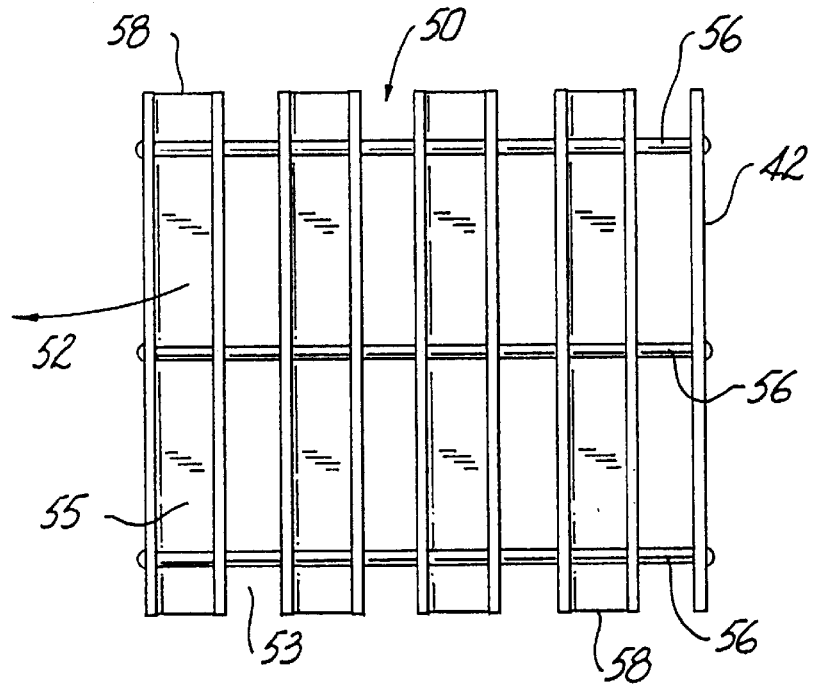
FIG. 4 illustrates a side plan view of an alternate embodiment of the heat conducting walls showing heat conducting spacers positioned between the walls of the plate-type heat exchanger of FIG. 2.
Figure 5:
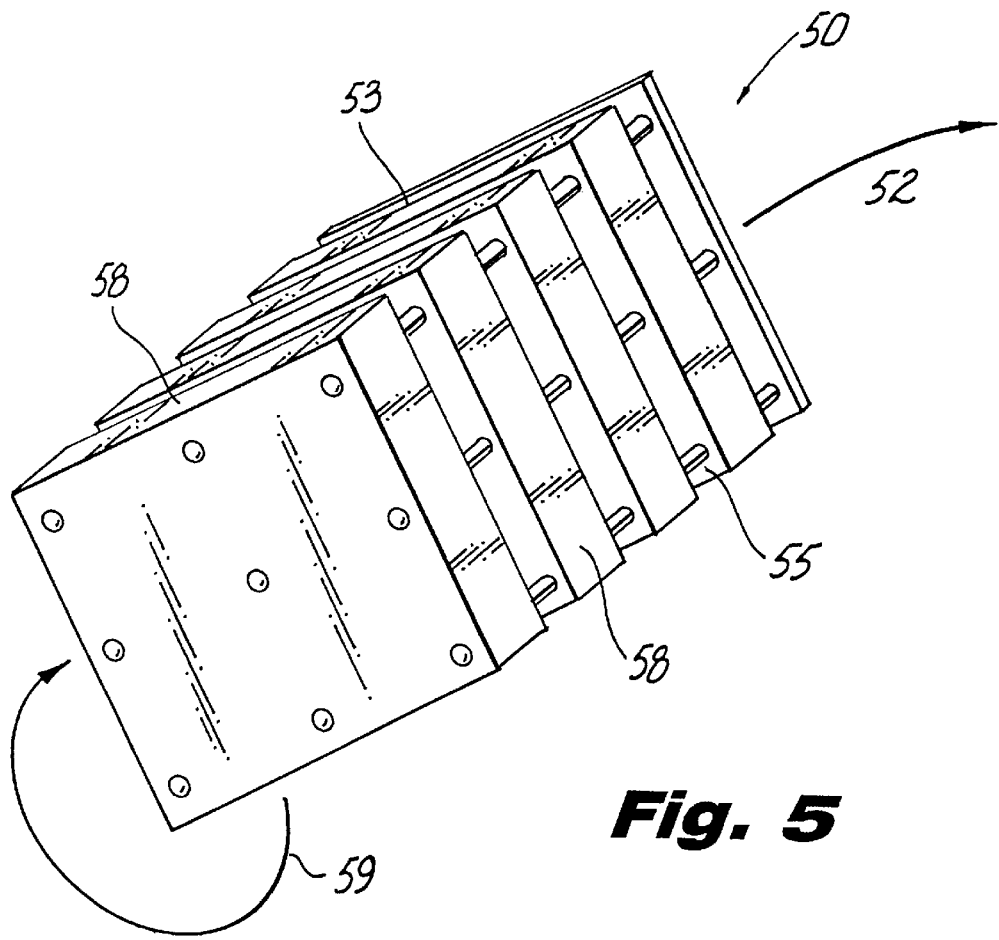
FIG. 5 illustrates a perspective view of the heat conducting walls of the embodiment of FIG. 4 showing the flow blocking plates.

FIG. 4 illustrates an alternate embodiment of the heat exchanger in which the heat conducting walls 42 are separated by heat conducting spacers 56 which enhance the heat transfer between the walls. Blocking members 58 are provided in this embodiment which cover the exhaust channels 55 on the intake side, and further are provided to block the intake channels 53 on the exhaust side. (The blocking members 58 on the exhaust side are not shown in FIG. 4 for clarity.) Turning now to FIG. 5, there is shown the embodiment of FIG. 4 with the blocking members 58 in place. Air entering the heat exchanger in the direction of the arrow 50 on the intake side at intake channels 53 is prevented from entering the exhaust channels 55 by the blocking members 58, and after the air passes over the cooling coils (not shown) and is redirected in the plenum chamber, as at arrow 59, to exit the heat exchanger in the direction of arrow 52, the blocking members 58 prevent the air from entering the intake channels 53 as the air flows through exhaust channels 55 in that direction.

Figure 6:
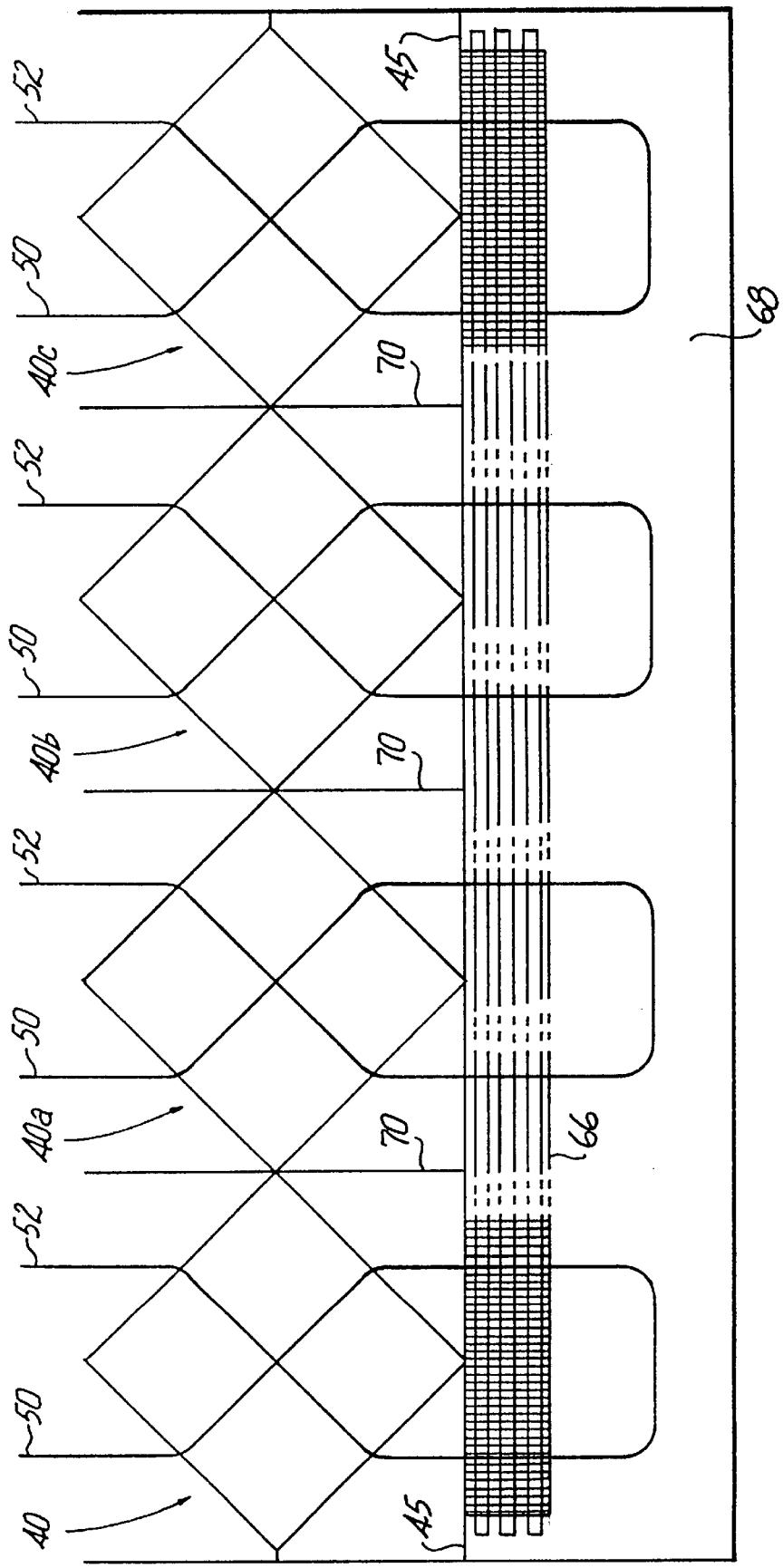
FIG. 6 illustrates a system utilizing plate-type crossflow air-to-air heat exchangers positioned in series according to the present invention.
Figure 7:
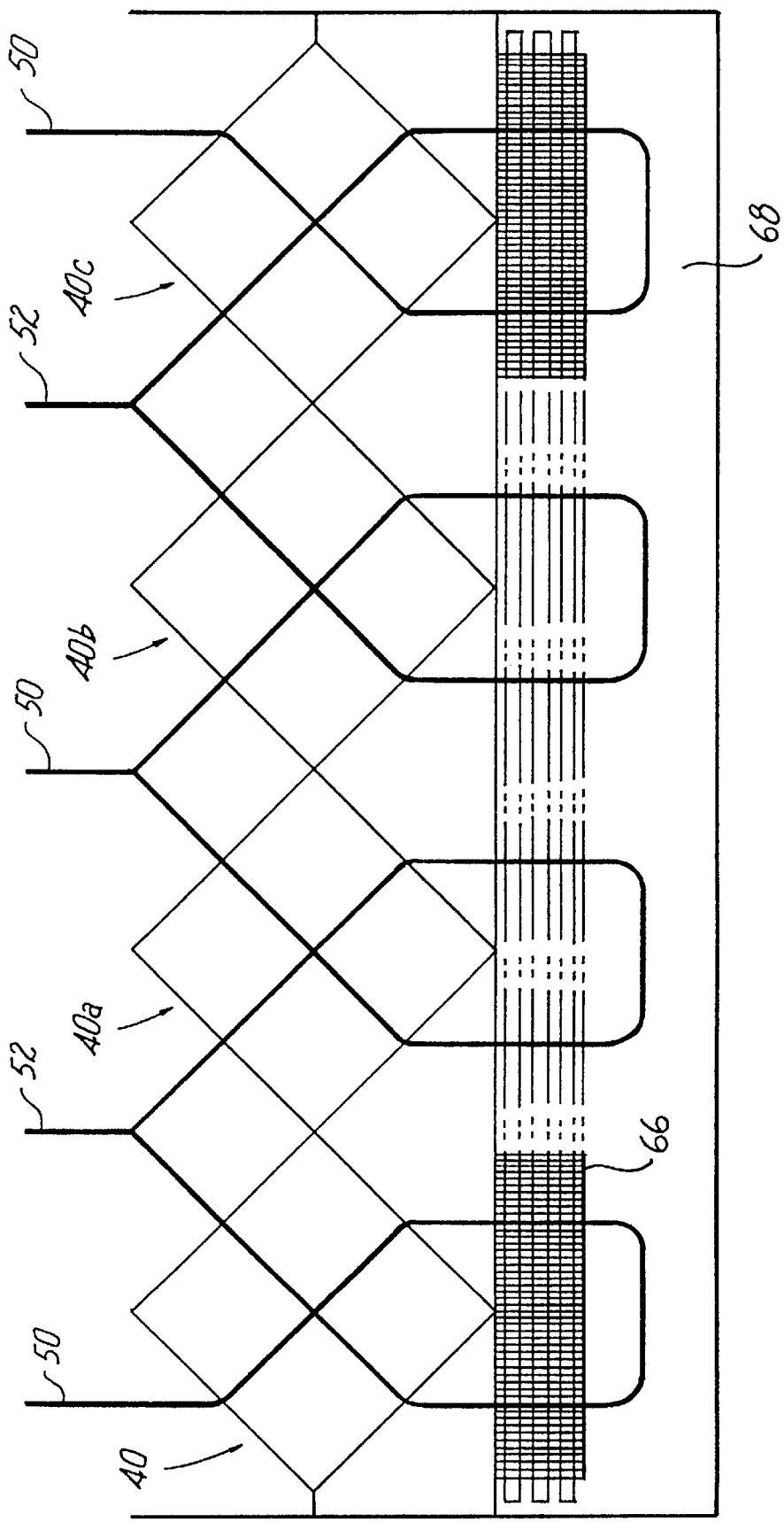
FIG. 7 illustrates the system of FIG. 6 with modified intake and exhaust flow paths.

FIG. 6 illustrates the heat exchanger 40 utilized in a system which permits a plurality of heat exchangers 40, 40a, 40b and 40c to be arranged in series arrangement to handle large volumes of air in an economical and efficient manner. In this embodiment, air enters each of the intake ports of the heat exchangers in the direction of arrow 50, is precooled as it passes through the intake channels 53 of heat conducting plates 42 and enters the plenum chamber 68 for further cooling and for condensing the water vapor entrained in the airstream as it passes over cooling coil 66. Walls 70 and beads 43 ensure that the intake airflow and exhaust airflow are not mixed prior to passing through coil 68. The air is then redirected as shown and passes over the cooling coil 66 a second time and re-enters the exhaust channels 55 of heat conducting plates 42 of the heat exchanger to permit the transfer of heat in the heat conducting walls 42 to warm the airstream as it exits the heat exchanger in the direction of arrow 52. The embodiment of FIG. 6 provides a common plenum chamber 68, as well as a common cooling coil 66 as shown. FIG. 7 is similar to FIG. 6 except the intake airflow and exhaust airflow are consolidated to eliminate several ports and to enable the elimination of separating walls 70.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. A system for conditioning an airstream, comprising:
   at least one fan for forcing air through said system,
   a first heat exchanger having an intake port, an exhaust port, a plenum chamber remote from said intake port and said exhaust port, and a plurality of heat conducting walls orthogonal to and aligned along a first axis and defining channels for passage of air from said intake port to said plenum chamber and from said plenum chamber to said exhaust port, alternating ones of said channels defining intake channels and exhaust channels, said intake channels being sealed from said exhaust channels except at said plenum chamber such that said intake channels are in fluid communication with said exhaust channels at said plenum chamber;
   at least one other heat exchanger having an intake port, an exhaust port, and having said plenum chamber remote from said intake port and said exhaust port, and a plurality of heat conducting walls orthogonal to and aligned along a second axis laterally spaced from the first axis, defining channels for passage of air from said intake port to said plenum chamber and from said plenum chamber to said exhaust port, alternating ones of said channels defining intake channels and exhaust channels, said intake channels being sealed from said exhaust channels except at said plenum chamber such that said intake channels are in fluid communication with said exhaust channels at said plenum chamber, wherein the heat exchangers are positioned adjacent to each other; and
   a common cooling conduit located in said plenum chamber of said first heat exchanger and said at least one other heat exchanger;
   said cooling conduit being positioned adjacent to and spaced from said heat conducting walls of said first heat exchanger and said at least one other heat exchanger; and
   said cooling conduit being positioned in a plane substantially parallel to a plane defined by said plurality of heat conducting walls in said first heat exchanger and said at least one other heat exchanger.

2. A system according to claim 1, wherein said intake port of said first heat exchanger is in fluid communication with said intake port of said other heat exchanger.

3. A system according to claim 2, wherein said exhaust port of said first heat exchanger is in fluid communication with said exhaust port of said other heat exchanger.

4. A system according to claim 1, further comprising a plurality of heat exchangers arranged in series including a common plenum chamber and said common cooling conduit.

* * * * *